(12) United States Patent
Liao

(10) Patent No.: US 7,328,868 B2
(45) Date of Patent: Feb. 12, 2008

(54) WIRE-WINDING DEVICE FOR TWO KINDS OF CABLES

(76) Inventor: Sheng-Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 336 days.

(21) Appl. No.: 11/060,537

(22) Filed: Feb. 18, 2005

(65) Prior Publication Data
US 2006/0186248 A1    Aug. 24, 2006

(30) Foreign Application Priority Data
Jul. 13, 2004    (TW) ............... 93211031 U

(51) Int. Cl.
*B65H 75/48* (2006.01)
(52) U.S. Cl. ............... 242/378.1; 242/378.4; 191/12.4
(58) Field of Classification Search ............ 242/378, 242/378.1–378.4, 388, 388.1, 388.6
See application file for complete search history.

(56) References Cited

U.S. PATENT DOCUMENTS

| 6,371,398 | B1 * | 4/2002 | Liao | 242/378.1 |
| 6,375,109 | B1 * | 4/2002 | Liao | 242/378 |
| 6,416,005 | B1 * | 7/2002 | Liao | 242/378.1 |
| 6,439,491 | B1 * | 8/2002 | Liao | 242/378.1 |
| 6,474,585 | B2 * | 11/2002 | Liao | 242/378.1 |
| 6,497,378 | B1 * | 12/2002 | Liao | 242/378.1 |
| 6,803,525 | B1 * | 10/2004 | Liao | 174/134 |
| 6,808,138 | B2 * | 10/2004 | Liao | 242/378.1 |

* cited by examiner

Primary Examiner—Peter M. Cuomo
Assistant Examiner—Sang Kim
(74) Attorney, Agent, or Firm—Rosenberg, Klein & Lee

(57) ABSTRACT

A wire-winding device for two kinds of cables is described. The device has a base, two winding plates, two communication cables and a volute spring. The two winding plates are arranged inside the base, the two communication cables are rolled around the two winding plates, respectively, and the volute spring is connected between the two winding plates. The wire-winding device can be used with various plugs and earphones for broad application.

15 Claims, 10 Drawing Sheets

WIRE-WINDING DEVICE FOR TWO KINDS OF CABLES

BACKGROUND OF THE INVENTION

1. Field of the Invention

The present invention relates to a wire-winding device for two kinds of cables, and particularly relates to a wire-winding device that can roll the two kinds of cables automatically for broad application.

2. Description of Related Art

As communication technologies, such as computers, modems, telephones, or facsimile machines, develop, wires or cables are provided to connect therebetween. However, the wires or cables will be messed up if too long or too many, or will not be conform to real requirements when too short. There are many wire-winding boxes used for various communication devices. Most wire-winding boxes basically have a base, a communication cable, a winding plate and a volute spring, and a plug of the communication cable can be used to plug in for information.

In addition, the wire or cable of the conventional wire-winding box will be stretched taut due to the strong elasticity of the volute spring, and cannot be kept outside with a proper length. Another conventional wire-winding box can be equipped with a resilient swing member clamped with a cutout formed of the peripheral of the winding plate for orientation.

SUMMARY OF THE INVENTION

A wire-winding device for two kinds of cables is disclosed for providing two kinds of wires or cables disposed therein for connecting various plugs or earphones so as to be applied broadly.

A wire-winding device for two kinds of cables is disclosed. The device includes a base having a receiving cavity formed therein, a first winding plate pivoted in the receiving cavity of the base, a second winding plate pivoted in the receiving cavity of the base, a first communication cable rolled on the first winding plated and having two ends stretched out of the base, a second communication cable rolled on the second winding plated and having two ends stretched out of the base, and a volute spring connected between the first and second winding plates.

To provide a further understanding of the invention, the following detailed description illustrates embodiments and examples of the invention. Examples of the more important features of the invention have thus been summarized rather broadly in order that the detailed description thereof that follows may be better understood, and in order that the contributions to the art may be appreciated. There are, of course, additional features of the invention that will be described hereinafter which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF PREFERRED EMBODIMENTS

Figure 1:
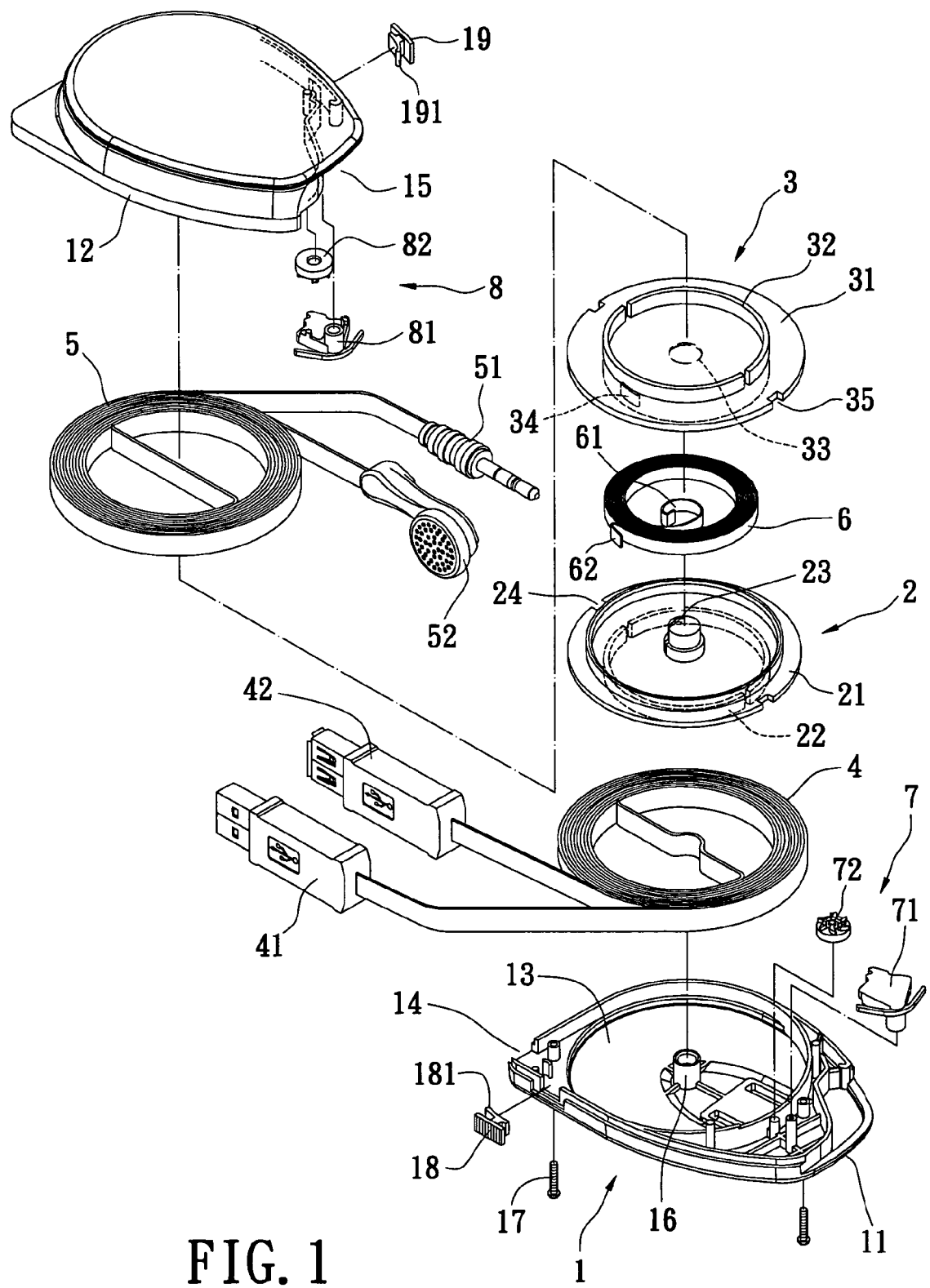
FIG. 1 is a decomposition view of a first embodiment according to the present invention.
Figure 2:
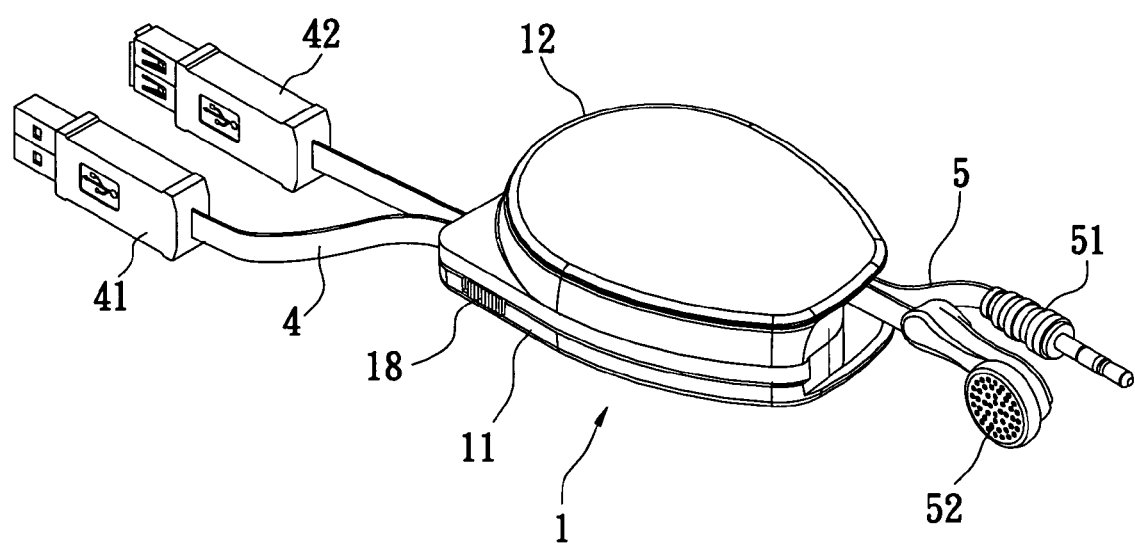
FIG. 2 is a perspective view of the first embodiment according to the present invention.
Figure 3:
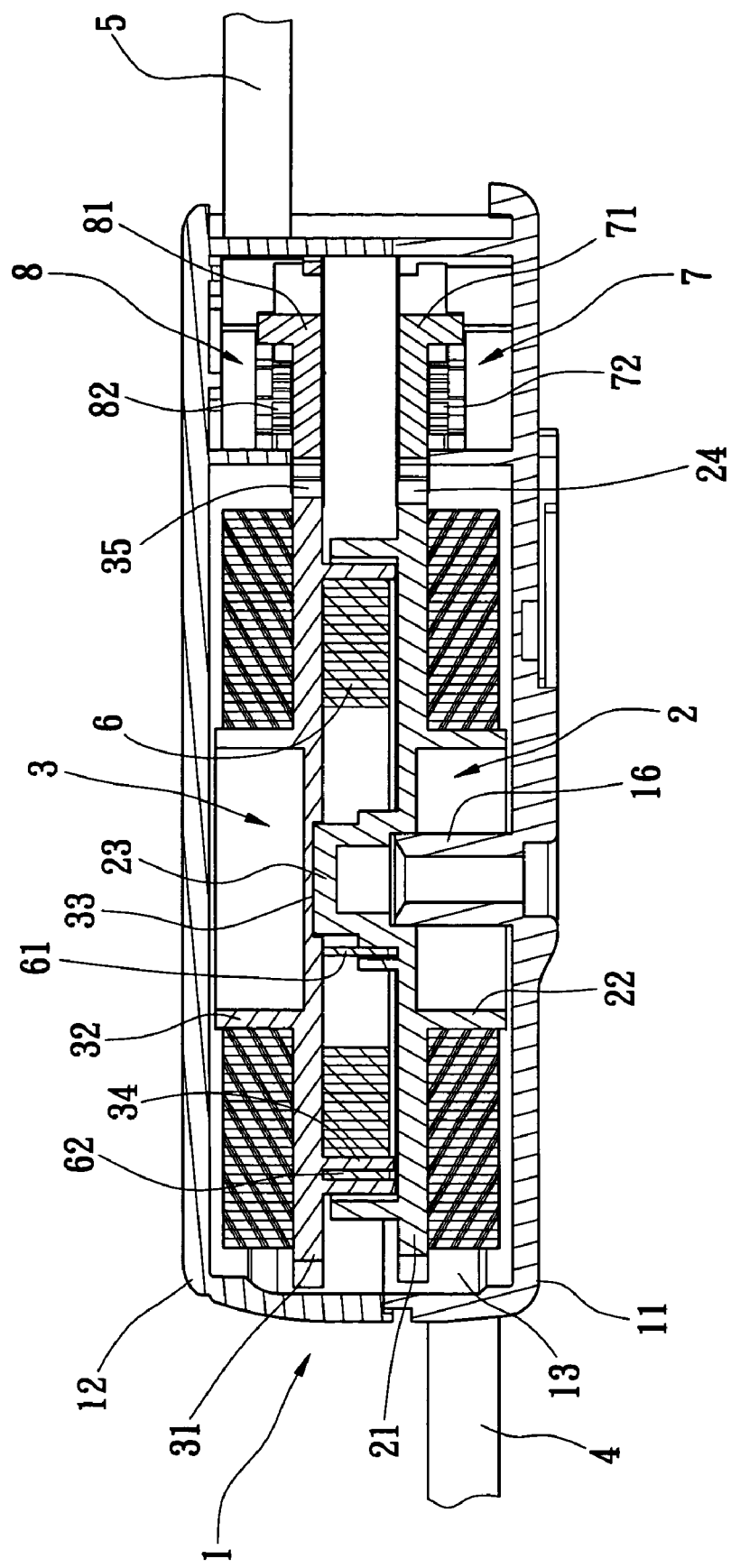
FIG. 3 is a cross-sectional profile of the first embodiment according to the present invention.
Figure 4:
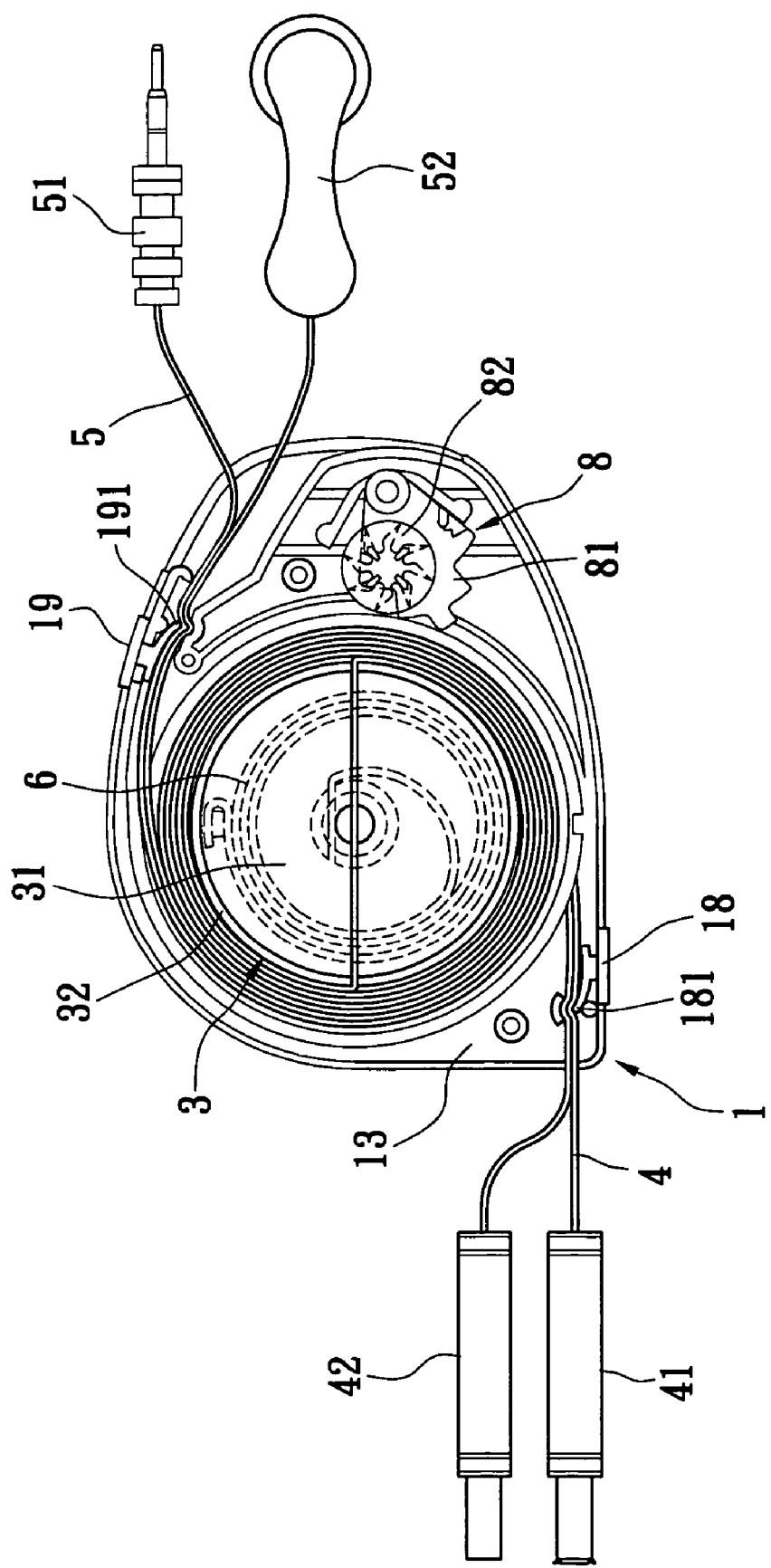
FIG. 4 is a perspective view of a first application when the first embodiment is in use according to the present invention.
Figure 5:
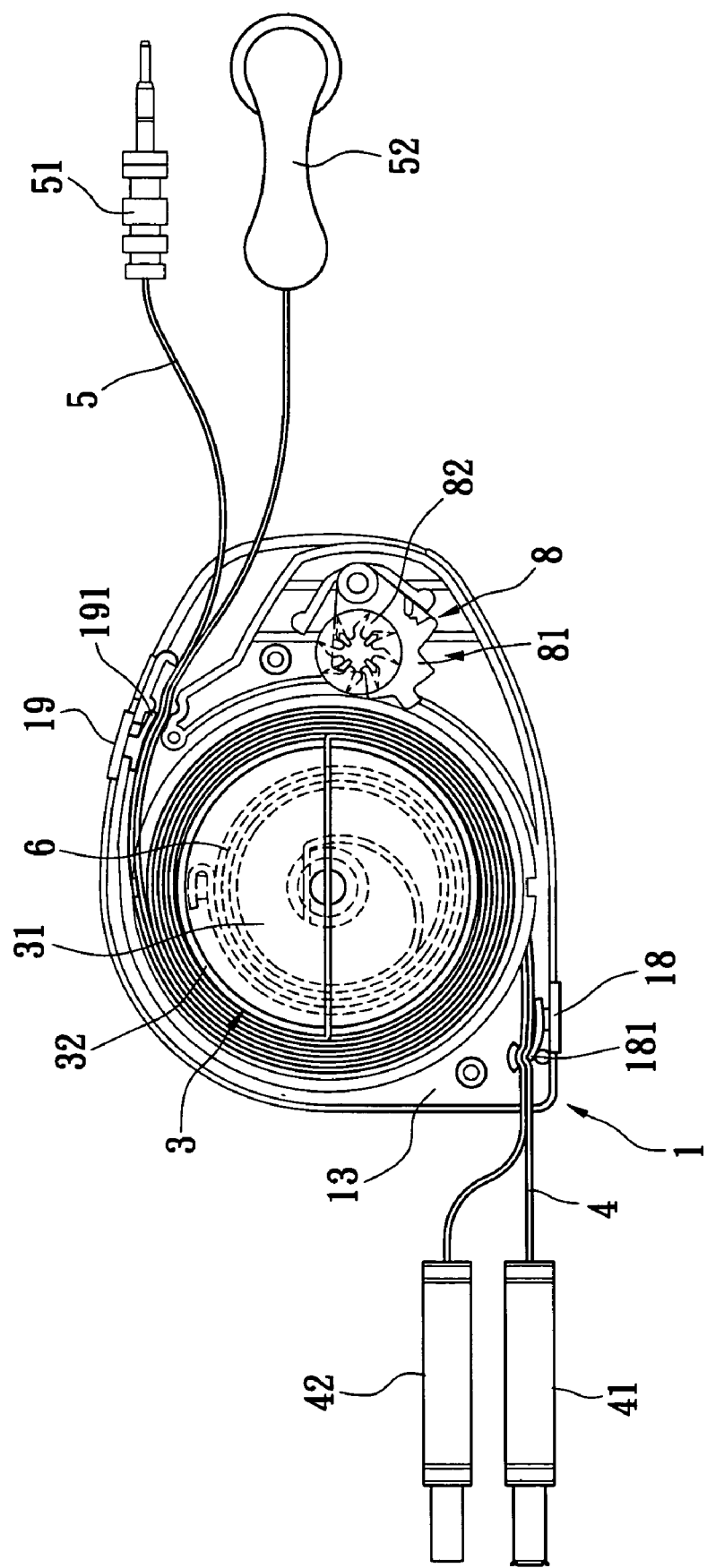
FIG. 5 is a perspective view of a second application when the first embodiment is in use according to the present invention.

With respects to FIGS. 1 to 4, a preferred embodiment of a wire-winding device for two kinds of cables according to the present invention is disclosed. The device includes a base 1, a first winding plate 2, a second winding plate 3, a first communication cable 4, a second communication cable 5 and a volute spring 6. The base 1 is hollow and includes a first half housing (or a lower cover) 11 and a second half housing (or an upper cover) 12 clamped or screwed together. The base 1 has a receiving cavity 13 formed therein for receiving the first winding plate 2, the second winding plate 3, the first communication cable 4, the second communication cable 5 and the volute spring 6. The base 1 has a first hole 14 through which the first communication cable 4 passes and a second hole 15 through which the second communication cable 5 penetrates. The base 1 has a pillar 16 that is hollow and disposed therein.

The first winding plate 2 is pivoted in the receiving cavity 13 of the base 1 and has a first plate body 21 and a hollow first winding shaft 22 disposed on a side of the first plate body 21. The first winding plate 2 pivots to an end of the pillar 16 via a first central shaft 23, so as to rotate the first winding plate 2 in the receiving cavity 13.

The second winding plate 3 is pivoted in the receiving cavity 13 of the base 1 and has a second plate body 31 and a hollow second winding shaft 32 disposed a side of the second plate body. The second winding plate 3 is disposed over the first winding plate 2. The second winding plate 3 pivots to an end of a first central shaft 23 via a second central shaft 33, so as to rotate the second winding plate 3 in the receiving cavity 13.

The first communication cable 4 has two ends connecting plugs 41 and 42. The first communication cable 4 is folded and winds about the first central shaft 22 of the first winding plate 2. Each of the two ends of the first communication cable 4 extends out of the base 1 via the first hole 14.

The second communication cable 5 has two ends connected to a plug 51 and an earphone 52. The second communication cable 5 is folded and winds about the second central shaft 32 of the second winding plate 5. Each of the two ends of the second communication cable 5 extends out of the base 1 via the second hole 15.

The volute spring 6 is connected between the first and second winding plates 2 and 3, and has first and second clamp ends 61, 62 locked on the first central shaft 22 of the first winding plate 2 and a clamping portion 34 disposed on a side of the second winding plate 3, so as to orientate the volute spring 6 between the winding plates 2 and 3. Thus, the first and second winding plates 2, 3 operate relatively and the volute spring 6 storages energy.

The wire-winding device according to the present invention can receive very long communication cables 4, 5 immediately and connect the plugs 41, 42 and 52 for information. Two ends of each communication cable 4, 5 are pulled by the volute spring 6 for keeping the drawing force from the cables intertwined.

In addition, the communication cables 4, 5 can avoid interfering with the user. The first plate body 21 of the first winding plate 2 has a plurality of slots 24 formed in a periphery thereof. A first reciprocal control device 7 is adjacent to the first winding plate 2 and includes a resilient swing member 71 free waving and a ratchet 72 free rotating. When the relationship between the resilient swing member 71, the ratchet 72 and the first slots 24 of the first winding plate 2 operates, the first communication cable 4 is capable of being fixed or reeled by pulling or releasing cyclically.

The second winding plate 3 has a second plate body 31. The second plate body has a plurality of second slots 35 formed at a peripheral thereof. A second reciprocal control device 8 is adjacent to the second winding plate 3. The second reciprocal control device 8 includes a resilient swing member 81 that waves freely and a ratchet 82 free that rotates freely. When the relationship between the resilient swing member 81, the ratchet 82 and the second slots 35 of the second winding plate 3 operates, the second communication cable is fixed or reeled by pulling or releasing cyclically.

The base 1 has a first tug bottom 18 arranged and sliding along a lateral side thereof and next to the first hole 14. The first tug bottom 18 has a first tug portion 181 abutting against to lock the first communication cable 4 when the first tug bottom 18 is moved towards the first hole 14. In contrast, when the first tug bottom 18 is moved away from the first hole 14, the first tug portion 181 is released so that the first communication cable 4 can be pulled. The first tug bottom 18 can control if the ends of the first communication cable 4 stretch.

The base 1 has a second tug bottom 19 arranged and sliding along a lateral side thereof and next to the second hole 15. The second tug bottom 19 has a second tug portion 191 abutting against to lock the second communication cable 5 when the second tug bottom 19 is moved towards the second hole 15. In contrast, when the second tug bottom 19 is moved away from the second hole 15, the second tug portion 191 is released so that the second communication cable 5 can be pulled. The second tug bottom 19 can control if the ends of the second communication cable 5 stretch.

Figure 6:
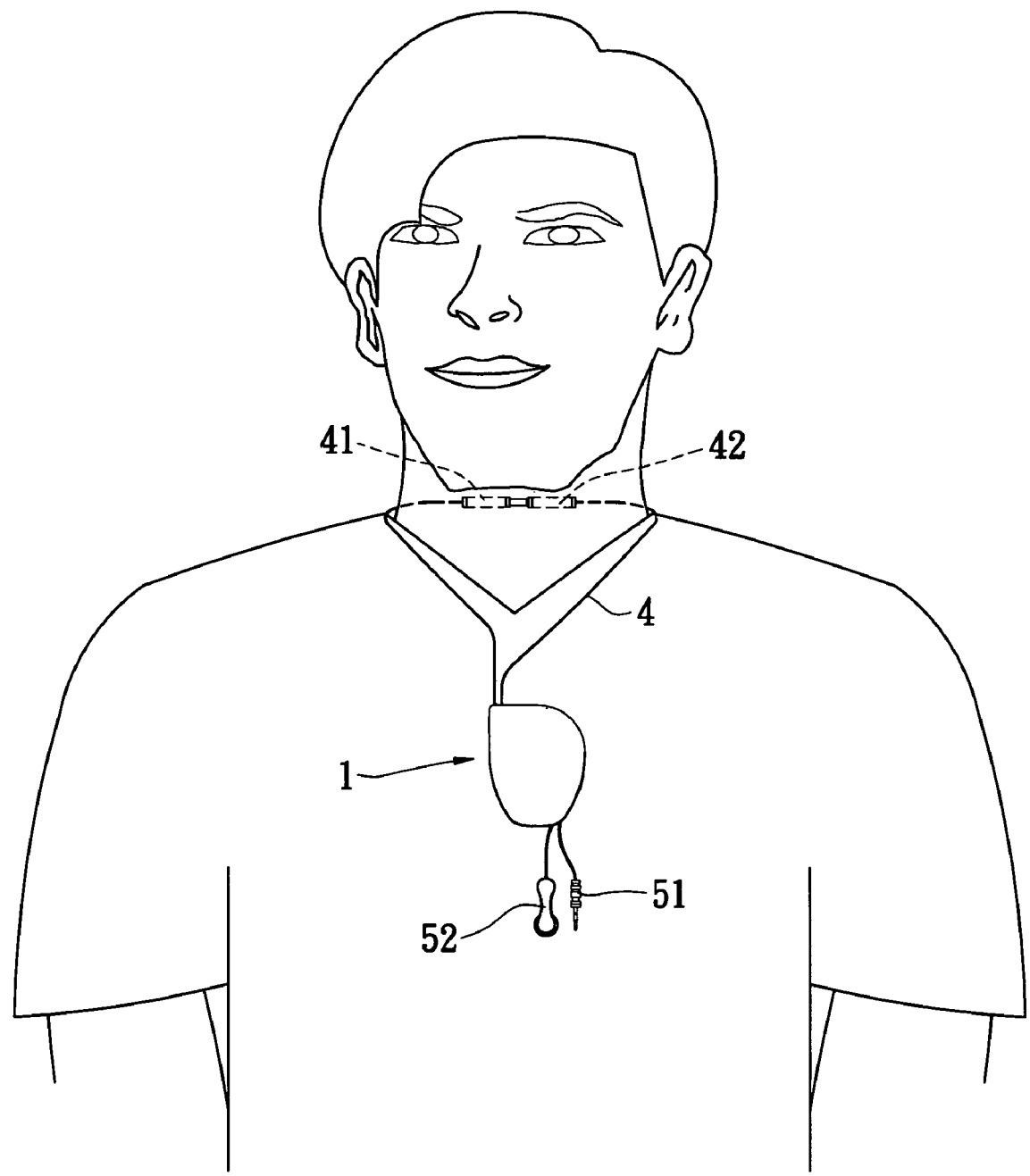
FIG. 6 is a perspective view of a third application when the first embodiment is in use according to the present invention.

Referring to FIG. 6, the plugs 41, 42 connected to two ends of the first communication cable 4 mate with each other for circling connection, so as to be hung on the neck of the user for easy carrying.

Figure 7:
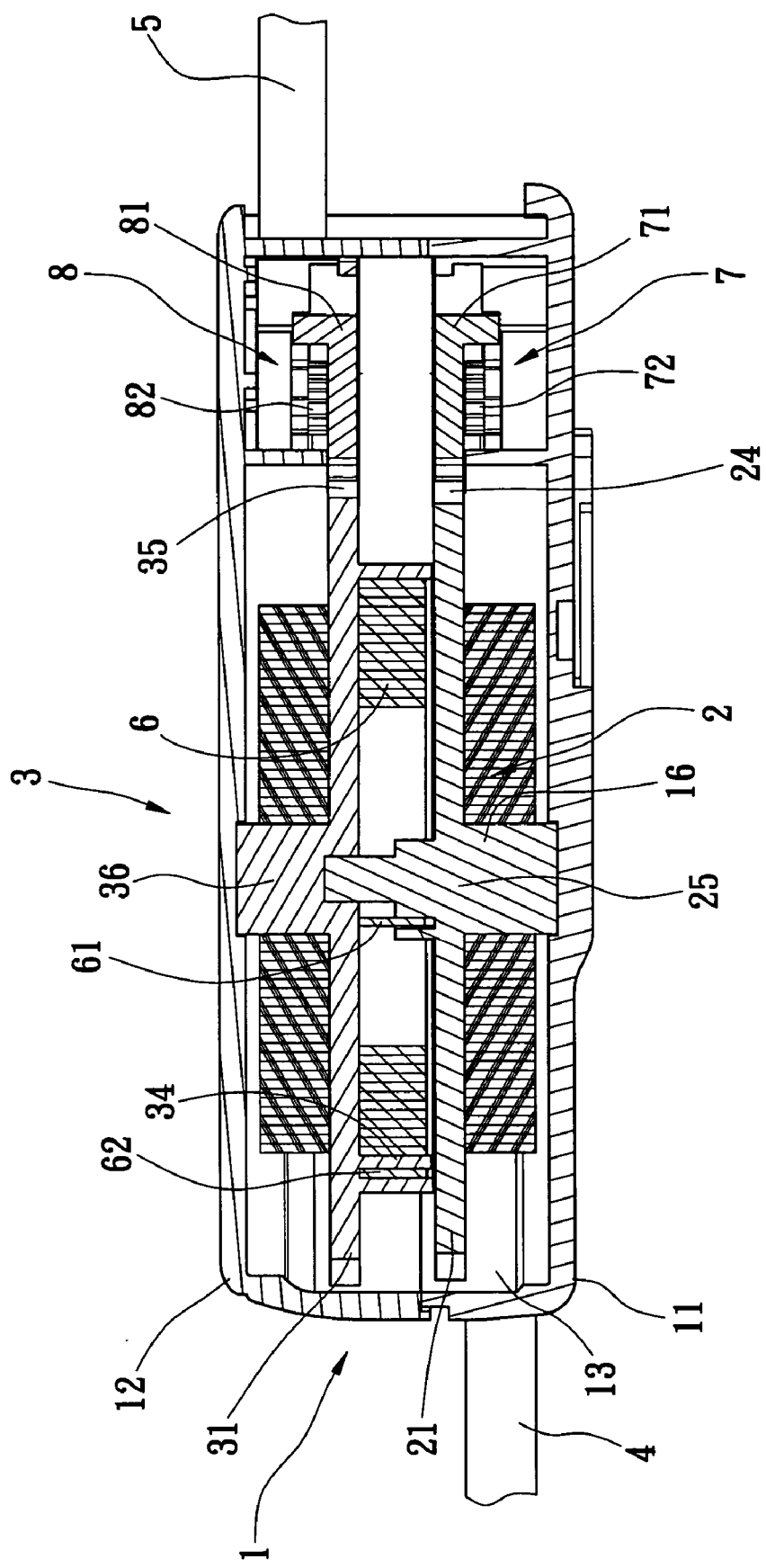
FIG. 7 is a cross-sectional profile of the second embodiment according to the present invention.

With respect to FIG. 7, the first winding plate 2 can pivot to the base 1 and the second winding plate 3 via the first central shaft 25 thereof. the central winding shaft 36 of the second winding plate 3 pivots to the base 1 and the first central shaft 25 of the first winding plate 2, so that the first winding plate 2 and the second winding plate 3 can be arranged and rotated inside the receiving cavity 13. The first and second communication cables 4, 5 are wound about the first and second central shafts 25, 36, respectively.

Figure 8:
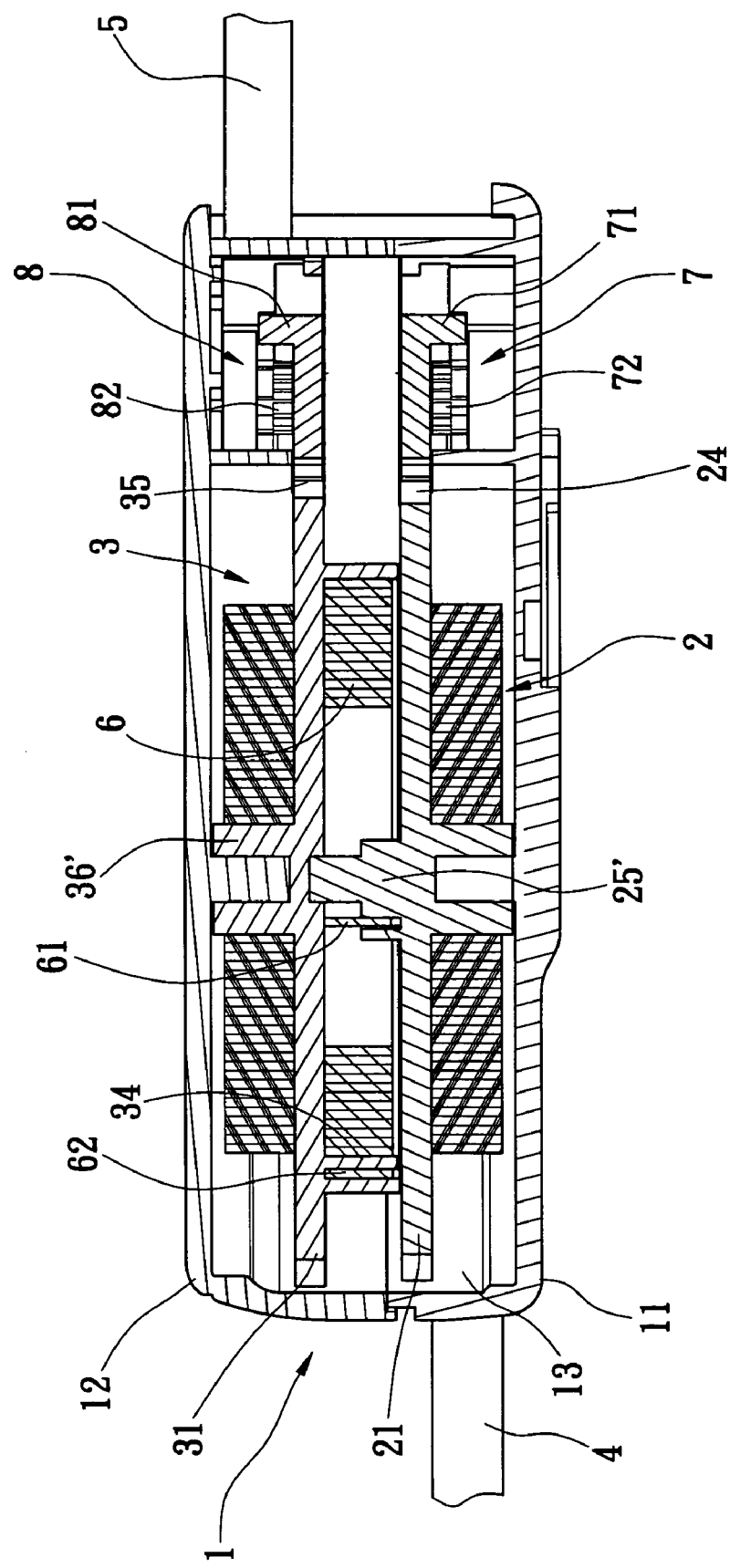
FIG. 8 is a cross-sectional profile of the third embodiment according to the present invention.

In addition, FIG. 8 shows the first central shaft 25' of the first winding plate 2 pivoting to the base 1 and the second winding plate 2. The second central shaft 36' of the second winding plate 3 pivots to the base 1 and the first central shaft 25' of the first winding plate 2. Therefore, the first and second winding plates 2, 3 rotates inside the receiving cavity.

Figure 9:
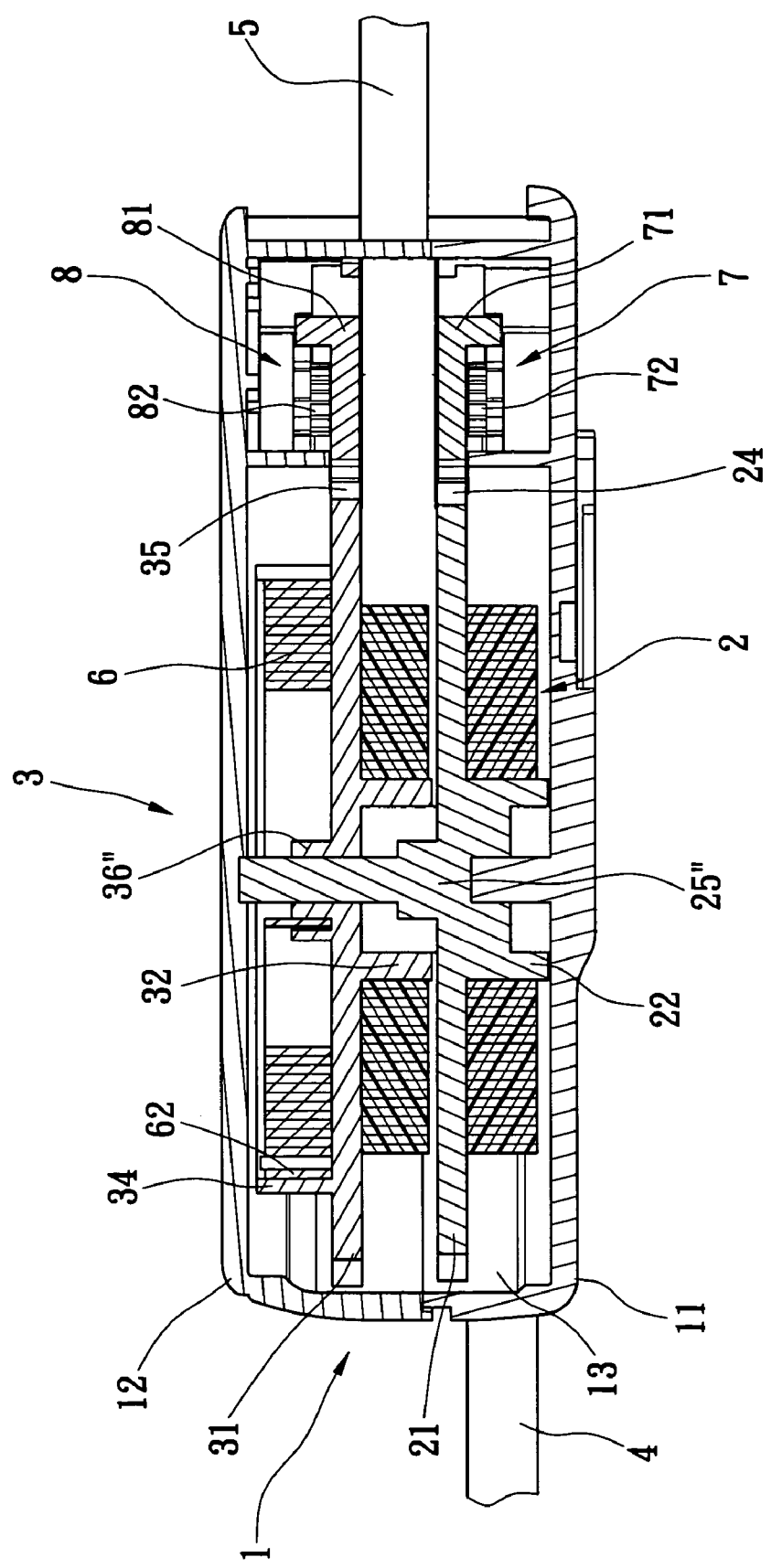
FIG. 9 is a cross-sectional profile of a fourth embodiment according to the present invention.

In accordance with FIG. 9, the first winding plate 2 pivots to the base 1 and the second winding plate 3 via the first central shaft 25', and the second winding plate 3 pivots to the first central shaft 25" of the second winding plate 3 via the second central shaft 36". Therefore, the first and second winding plates 2, 3 rotate inside the receiving cavity 13, and the volute spring 6 is arranged on the second winding plate 3.

The two cables 4, 5 are arranged inside the device for various plugs and earphones for further broadly application.

Figure 10:
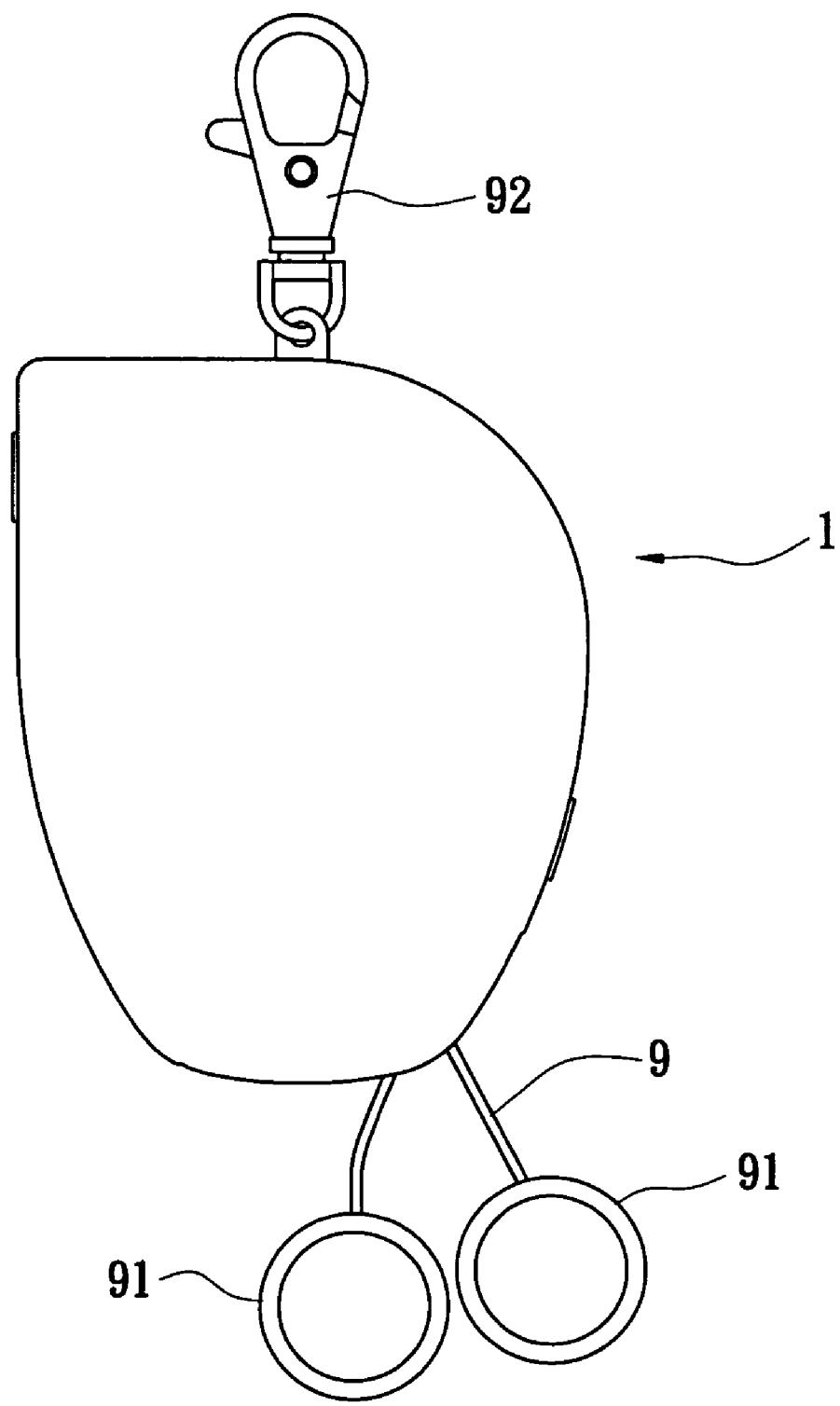
FIG. 10 is a top view of a fifth embodiment according to the present invention.

As illustrated in FIG. 10, the communication cable 5 can be replaced with a usual second wire 9. The wire 9 has two ends connecting key ring 91 for hanging the key. A hook 92 is disposed to a lateral side of the base 1 for clipping to the waist. In addition, the first communication cable 4 can be replaced with another wire (not shown).

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A wire-winding device for a plurality of cables, and comprising:
   a first cable formed by a first extending cable member and a second extending cable member;
   a second cable formed by a third extending cable member and a fourth extending cable member;
   a base having a receiving cavity formed therein;
   a first winding plate pivoted in the receiving cavity of the base to collect the first cable whereby said first and second cable members are rolled on said first winding plate in overlying relation with a pair of ends reversibly extending from said receiving cavity through a first single opening;
   a second winding plate pivoted in the receiving cavity of the base to collect the second cable whereby said third and fourth cable members are rolled on said second winding plate in overlying relation with a pair of ends reversibly extending from said receiving cavity through a second single opening; and,
   a volute spring connected between the first and second winding plates.

2. The device as claimed in claim 1, wherein the base is hollow and includes a first half housing and a second half housing clamped or screwed together.

3. The device as claimed in claim 1, wherein the base has a first hole for the first communication cable to pass through and a second hole for the second communication cable to pass through.

4. The device as claimed in claim 1, wherein the base has a pillar disposed therein, the first winding plate is pivoted to the pillar via a first central shaft thereof, and the second winding plate is pivoted to an end of the pillar via a second central shaft thereof.

5. The device as claimed in claim 1, wherein the first winding plate pivots with the base and the second winding plate via a first central shaft thereof, and the second winding plate pivots with the base and the first central shaft of the first winding plate via a second shaft thereof.

6. The device as claimed in claim 1, wherein the first winding plate pivots to the base and the second winding plate via a first central shaft thereof, and the second winding plate pivots to the first central shaft via a second central shaft.

7. The device as claimed in claim 1, wherein the base has a first tug bottom arranged and sliding along a lateral side thereof, and the first tug bottom has a first tug portion for abutting against the first cable to lock said cable.

8. The device as claimed in claim 1, wherein the base has a second tug bottom arranged and sliding along a lateral side thereof, and the second tug bottom has a second tug portion for abutting against the second cable to lock said cable.

9. The device as claimed in claim 1, wherein the first winding plate has a first plate body, and the first plate body has a first winding shaft for the first cable wound thereon.

10. The device as claimed in claim 1, further including a first reciprocal control device adjacent to the first winding plate, wherein the first winding plate has a plurality of first slots, and the first reciprocal control device includes a swing member waving freely and a ratchet rotating freely, whereby when a relationship between the swing member, the ratchet and the first slots of the first winding plate operates, the first cable is fixed or reeled by pulling or releasing cyclically.

11. The device as claimed in claim 1, wherein the second winding plate has a second plate body, and the second plate body has a second winding shaft for the second cable wound thereon.

12. The device as claimed in claim 1, further including a second reciprocal control device adjacent to the second winding plate, wherein the second winding plate has a plurality of second slots, and the second reciprocal control device includes a swing member waving freely and a ratchet rotating freely, whereby when a relationship between the swing member, the ratchet and the second slots of the second winding plate operates, the second cable is fixed or reeled by pulling or releasing cyclically.

13. The device as claimed in claim 1, wherein the two ends of the first cable connects to plugs and earphones, selectively.

14. The device as claimed in claim 1, wherein the two ends of the second cable connects to plugs and earphones, selectively.

15. The device as claimed in claim 1, wherein the volute spring has first and second clamping ends engaged with the first and second winding plates, respectively.

\* \* \* \* \*